Aug. 3, 1965    G. H. SCHURGER ETAL    3,198,078
MACHINE TOOL CONTROL CENTER
Filed Aug. 16, 1961    3 Sheets-Sheet 2
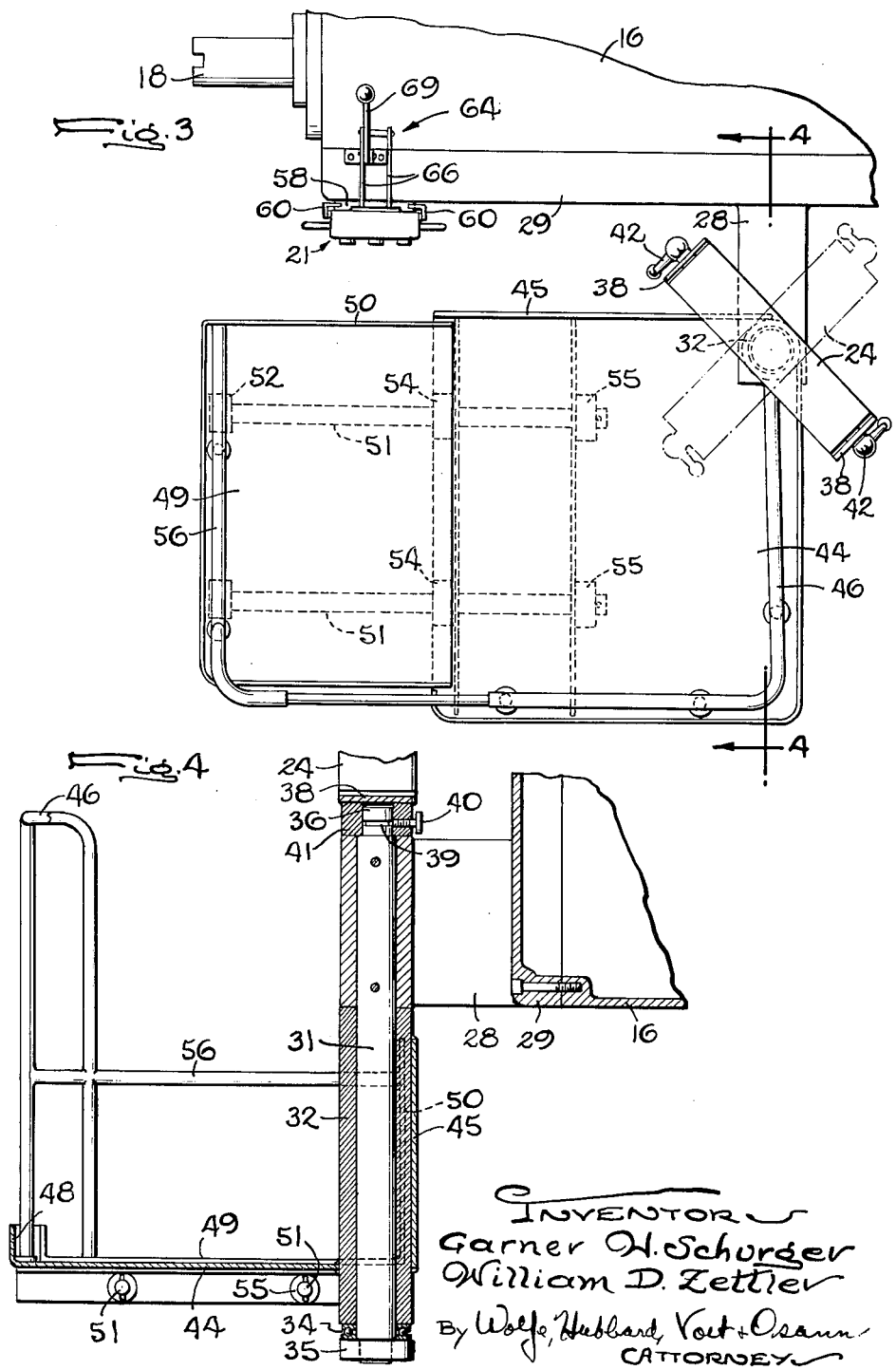

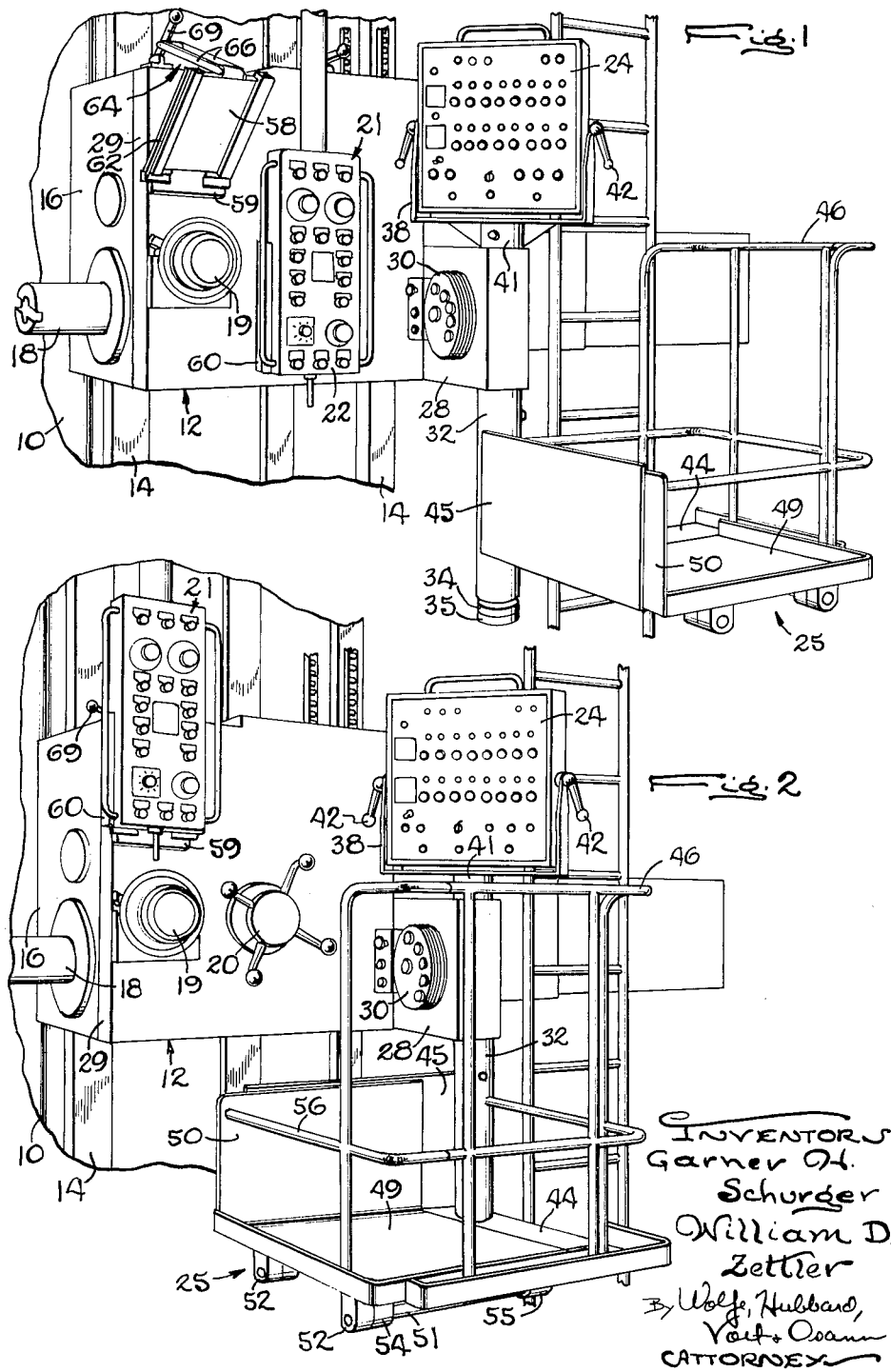

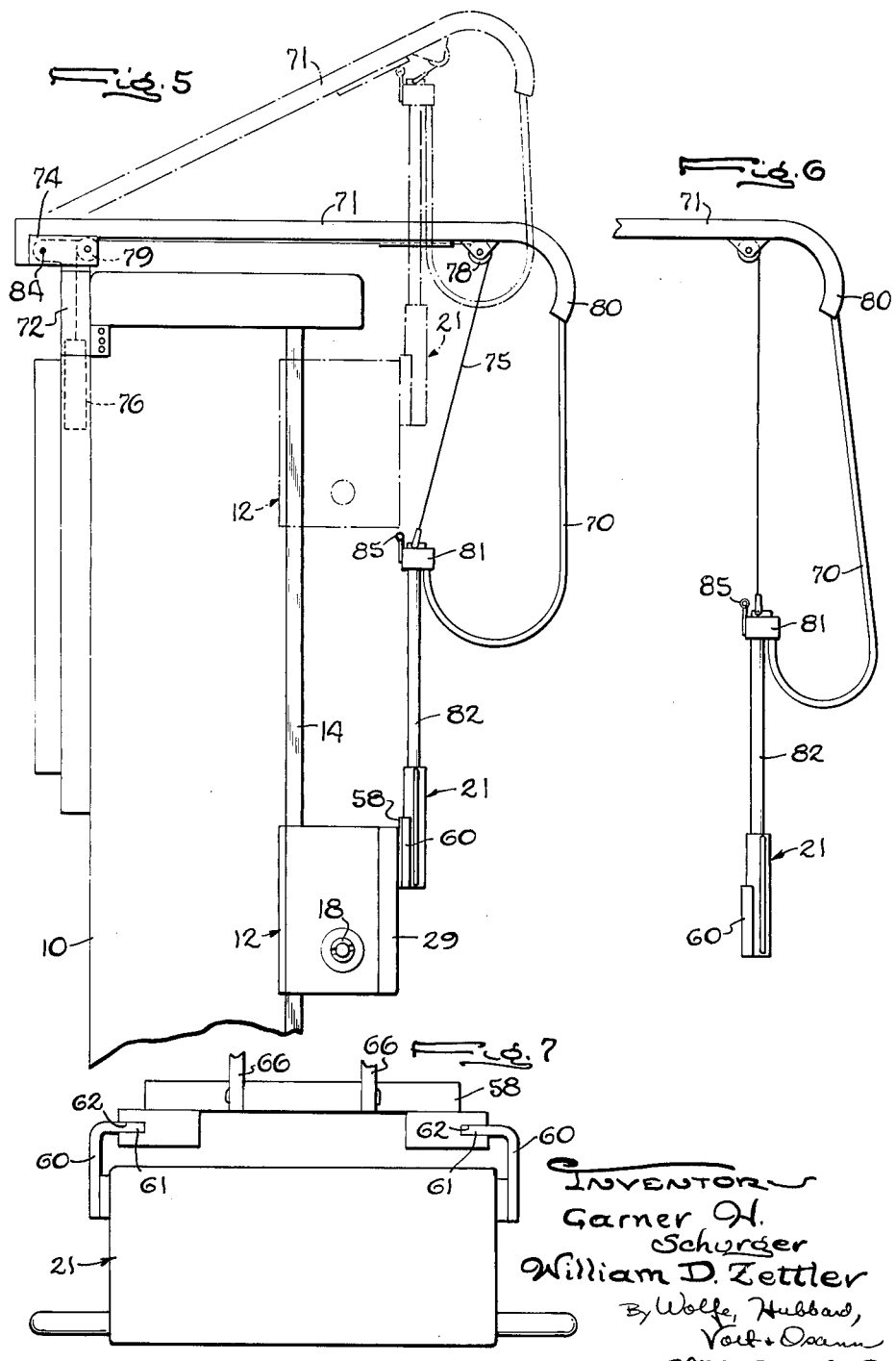

United States Patent Office 3,198,078
Patented Aug. 3, 1965

3,198,078
MACHINE TOOL CONTROL CENTER
Garner H. Schurger and William D. Zettler, both of Fond du Lac, Wis., assignors to Giddings & Lewis Machine Tool Company, Fond du Lac, Wis., a corporation of Wisconsin
Filed Aug. 16, 1961, Ser. No. 131,881
12 Claims. (Cl. 90—11)

The present invention relates to machine tools of the horizontal boring, milling and drilling type, and more particularly to machine tools of the foregoing character which are of a large size, include many complex controls, and are adapted for use in a wide variety of operations carried out with both manual and automatic controls.

Machines of the type herein referred to conventionally include a vertical column having vertical ways on one face guidably supporting a spindle carrying headstock. The spindle carries a tool capable of performing cutting operations on a workpiece, which is mounted on a suitable table adjacent the column. The desired cutting operations can then be carried out by adjusting the position of the headstock, the column and the cutting tool carried by the headstock spindle.

It will be appreciated that machine tools of the above type require a large number of complex operating controls, particularly when the machine tool is to be used for automatic tape controlled operations. These controls are most conveniently grouped together on panel boards and control boards located directly on the machine tool headstock as well as on control panels located at stations remote from the headstock so that the operator may position himself at a point from which he may observe closely the operation of the cutting tool. For use in such circumstances control stations suspended from overhead arms or booms in the form of pendant control panels, such as the pendant control station described and claimed in U.S. Patent 2,940,366, find particular utility.

One object of the present invention is to provide a machine tool of the above defined character having a new and improved control center wherein the machine tool controls are grouped about a central location in positions readily accessible for use with both manually controlled and automatically controlled operations.

Another object of the present invention is to provide a machine tool embodying the foregoing characteristics wherein said control center includes an improved pendant control station mounting which facilitates the use of a single pendant type control panel for both central and remote control of the headstock.

A more specific object is to provide, in a control center of the above character, an improved single pendant control station and mounting therefor to facilitate mounting the panel directly on the headstock or removing the panel for use at remote stations.

A further object of the present invention is to provide a machine tool of the above type which includes an improved pendant control panel support and a counterbalance finding particular, but not necessarily exclusive, utility with control panels mountable directly on the machine tool headstock.

A more detailed object of the present invention is to provide in a control center of the foregoing type an improved operator platform and mounting therefor for facilitating the use of the machine tool and improving the accessibility of the headstock and its controls.

Still another object of the present invention is to provide an improved mounting for the headstock controls of a machine tool in order to centralize such controls and adapt the machine for use with both manually controlled operations and automatically controlled operations, and at the same time increase the accessibility of the headstock elements and controls.

Other objects and advantages of the present invention will become apparent as the following description proceeds taken in connection with the accompanying drawings wherein:

FIGURE 1 is a perspective view of a machine tool headstock associated with a control center embodying the present invention and including an operator platform mounted on the headstock and swung back away from the headstock and with a pendant control panel hanging away from the headstock.

FIG. 2 is a perspective view similar to FIG. 1 but showing the pendant control panel mounted on the headstock and the operator platform swung into position for use by an operator when controlling the headstock.

FIG. 3 is a plan view of the headstock and operator platform illustrated in FIG. 2 and showing a portion of the platform floor in an extended position.

FIG. 4 is a view taken substantially in the plane of line 4—4 of FIG. 3 and showing the operator platform and mounting therefor in greater detail.

FIG. 5 is a front elevation view of a machine tool embodying the present invention and illustrating one form of a counterbalance arrangement for the pendant control panel.

FIG. 6 is an elevation view of the pendant control panel and support therefor.

FIG. 7 is an enlarged plan view of the structure for mounting the pendant control panel on the headstock.

While a certain illustrative structure embodying the present invention has been shown in the drawings and will be described below in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

The invention as illustrated in the drawings is exemplified in an illustrative horizontal boring, drilling and milling machine which comprises a vertical column 10 supported on a base (not shown) mounted directly on a floor or on appropriate ways for horizontal movement. The column carries on one face a headstock 12 which is guided for vertical movement on the column by appropriate ways 14. The illustrated headstock 12 comprises a main housing 16 which is equipped with a horizontally disposed axially slidable tool spindle 18 projecting from the front face thereof. For rotationally driving the spindle 18, a motor (not shown) is mounted at the rear of the headstock and connected to the spindle through a multi-speed transmission enclosed within the headstock housing. A plurality of control instrumentalities are mounted on the right-hand side of the headstock, including a spindle speed indicator dial and a control knob 19, and a pilot wheel 20 for controlling the axial feed of the spindle 18. Various control switches and the like are carried by a pendant control station 21, including a control panel 22, which swings within reach of an operator as he moves about the machine. In addition to the speed selector, pilot wheel and pendant control station, the control center also includes an electrical input-readout control panel 24 and an operator platform 25.

A machine tool of the type illustrated is quite versatile both with respect to the variety of machining operations it can perfrom and the types and sizes of workpieces that can be accommodated. The spindle 18 carries an appropriate cutting tool (not shown) for boring, drilling or tapping operations on a workpiece (not shown) supported in front of the spindle. Milling may likewise be carried out by mounting the workpiece on a table and traversing it past a rotating milling cutter on the spindle.

The transmission housed within the headstock affords a large number of different speeds and feeds which may be readily selected by adjusting the machine controls. Machines of this type are capable of performing a substantial number of different types of machining operations, and thus the controls themselves are quite complex. It is accordingly highly desirable that these controls be centralized and also simplified to as great an extent as possible, not only to facilitate the use thereof but also to make them suitable for operation with ease and rapidity. Moreover, it is desirable that the controls be centralized so that they are immediately available when needed and yet be simplified not only to enhance the ease of operation but also avoid complex manufacturing difficulties leading to an undue expense of producing the machine itself.

In order to accomplish the foregoing goals in a simple yet efficient manner, there is provided a novel control center located adjacent the right-hand face of the headstock on which the spindle speed selector and pilot wheel are mounted, which control center is highly versatile so that the operator can move about the machine with complete freedom of access to all parts and controls thereof.

The nucleus of the control center embodying the present invention is the operator platform 25 which is mounted directly on the headstock 12 for swinging movement with respect thereto. To this end, a relatively large rigid bracket 28 is mounted on the right-hand face or cover 29 of the headstock housing 16. In the modification shown the bracket 28 is secured to the headstock as an integral part of the cover 29, although it may be bolted to the cover 29 or fastened in any other appropriate manner to the headstock 12. Not only does the bracket 28 support the platform in the manner hereinafter to be described, but it also affords a suitable location for headstock instrumentation such as a spindle feed control or trip disk arrangement 30. This latter arrangement is geared to the spindle feed gear train by any appropriate means and being mounted on the bracket 28 is in a highly accessible position for setting adjustments.

Means are provided for supporting the platform 25 on the bracket 28 for swinging movement with respect to the headstock. One illustrative means comprises a depending post or shaft 31 fixed on the bracket 28 (FIG. 4) and journaling a sleeve 32 to which the platform 25 is permanently secured. The sleeve 32 surrounds the shaft 31 and is supported at the lower end thereof by a thrust bearing 34 which rests on an annular collar 35 secured to the bottom of the shaft 31. To support an electrical panel, such as the input-readout panel 24, the shaft 31 extends upwardly above the bracket 28 and defines a mounting post or stub shaft 36 to which the panel 24 is secured. The panel is desirably supported for swinging movement in a cradle 38. The stub shaft or post 36 is provided with a circumferential groove 39 for receiving a positioning pin or screw 40 on a depending sleeve 41 on the panel supporting cradle 38. To fix the position of the panel 24 in the cradle 38, clamping handles 42 are provided at either side of the panel.

The operator support platform is formed by a floor 44 and kick panel 45 rigidly secured, for example, by welding, to the supporting sleeve 32. At the outer marginal edges of the floor and kick panel there is provided a protective or safety railing 46 extending upwardly from the floor 44 adjacent a peripheral retaining flange 48.

In order to facilitate access to the end of the spindle 18 and the tool mounted thereon, provision is made for extending the platform 25. To this end, a secondary floor panel 49 and kick panel 50 is provided which telescopes with respect to the floor panel 44 and kick panel 45 of the platform proper. To support the secondary floor panel 49, there is provided a pair of guide rods 51 fixed at one end in depending brackets 52 on the secondary floor panel 49. Each of the guide rods 51 is slidably received in a pair of corresponding brackets 54, 55 fixed on the underside of the main floor panel 44. The safety railing 46 is also constructed for extension with the platform floor as shown in FIG. 2. To this end a portion 56 of the safety rail is fixed on the extensible secondary platform floor 49 and is telescopingly received within the portion of the safety railing fixed on the main platform floor 44. As shown in FIG. 2, the telescoping portions comprise the horizontal railing members which are conventionally formed from tubular conduit or pipe.

Provision is made for utilizing the panel 22 of the control station 21 as a part of the control center embodying the present invention, and accordingly means are provided for mounting the pendant station 21 directly on the face of the headstock 12. One illustrative means, the details of which are shown in FIGS. 3 and 7 of the drawings, comprises a bracket or cradle 58 for receiving the pendant station secured to the cover 29 of the headstock, at the upper left-hand corner thereof as shown in FIGS. 1 and 2. It will be appreciated that the pendant station 21 is relatively large and heavy, and while the pendant station 21 is counterbalanced (in a manner hereinafter to be described), it still requires some effort on the part of the operator to swing it back and forth towards the headstock. In order to facilitate mounting the pendant on the headstock, the bracket 58 is tiltably mounted on the headstock by means of a hinge or pivot device 59 at its lower edge so that it tilts outwardly at an angle from the headstock for receiving the pendant station as shown in FIG. 1. One illustrative means for mounting the pendant station 21 on the cradle 58 is shown in the drawings and comprises a pair of generally L-shaped guides 60 fixed on the pendant station and having inturned legs or flanges 61 slidably engageable in corresponding grooves 62 in the side edges of the cradle 58.

Means are also provided for clamping the cradle 58 in an upright position on the headstock once the pendant station 21 is positioned thereon. One such means comprises a toggle linkage, indicated generally at 64 (FIG. 3), having a U-shaped link including a pair of legs 66 pivotally mounted at one end on the cradle and joined by a cross piece 68 engaged with a clamping link 69 pivotally mounted on the headstock housing cover 29. The clamping link 69 extends between the legs 66 and rides against the cross piece 68 so that when pushed rearwardly it pulls the cradle against the headstock. With the bracket or cradle swung outwardly away from the headstock, the operator need merely position the flanges 61 in the grooves 62 and slide the pendant downwardly onto the cradle. The handle or clamping link 69 in the toggle linkage can then be pushed rearwardly while swinging the cradle and pendant towards the headstock. The toggle linkage thus affords a lock to prevent the pendant from swinging loose away from the headstock.

The pendant control station 21, when mounted in place on the headstock, appears as shown in FIG. 2 and is in position for use directly as the headstock control panel. The pendant station being positioned in a location readily accessible to an operator standing on the platform 25, not only affords a convenient control panel thereby eliminating a duplicate set of controls on the headstock but is also readily available should the operator wish to leave the platform to observe the machine tool from another position. He need merely release the cradle allowing it to swing outwardly, and then with a small force lift the pendant off of the cradle so that it swings free of the headstock.

In order to support the heavy pendant control station 21 and at the same time provide a support for the various control and utility conduits 70 leading to the control station 21, the control center embodying the invention includes a pendant control station suspension means. One illustrative means is shown in FIGS. 5 and 6 and comprises an overhead boom 71 which is supported at one end on a support post 72 secured to the rear of the column 10. The boom is mounted on the support post 72 for swinging movement with respect thereto and for this purpose a swivel joint 74 is provided between the upper end of the post 72 and one end of the boom 71. The control station 21 is suspended from the free end of the boom 71 by a suspension cable 75 affixed at one end to the pendant control station 21 and at the other end to a counterbalance means such as a weight 76 dangling within the boom support post 72. For guidably supporting the cable, the boom 71 is provided with a pair of pulleys 78, 79 over which the suspension cable 75 is guided. The free end of the boom 71 is curved downwardly, as shown at 80, to afford a guide channel for the various control and utility conduits 70.

For purposes of keeping the control and utility conduits 70 from hanging in front of the control station 21 when the headstock and control station is raised, the conduits 70 lead from the boom to a service fitting 81 at the upper end of a rigid member such as a pipe or conduit 82 affixed to the top of the control station 21. It will be appreciated that when the pendant control station 21 is mounted on the headstock 12 and the headstock is raised, the pendant control station will be raised at the same time. To prevent interference between the pendant support means and the headstock, the swivel joint 74 by which the boom supporting the pendant is mounted on the support post 72 includes a hinge or pivot joint afforded by a pivot pin 84. With this construction, as the headstock and pendant control station 21 are raised in unison, the upper end of the rigid conduit 82 engages the boom and swings it upwardly about the pivot pin 84. In order to prevent undue wear between the conduit and the boom, the conduit is provided with an abutment plate or roller 85 which engages a guide plate or track 86 on the underside of the boom 71.

When complete access to the headstock is desired, the pendant can be removed from the cradle and the platform 25 swung outwardly away from the headstock. Alternatively, the pendant can be mounted in place on the headstock and the platform positioned adjacent thereto, as shown in FIG. 2, and extended if desired, placing all of the controls within easy reach of an operator.

We claim as our invention:

1. In a machine tool including a vertical column supporting a spindle carrying headstock having controls thereon, the combination comprising an operator platform, a bracket rigidly fixed on the headstock and extending outwardly therefrom, and means mounting said platform on said bracket for swinging movement with respect thereto so that said platform can be swung from a position adjacent the headstock and the controls thereon to a position spaced therefrom whereby complete access can be had to the headstock.

2. In a machine tool including a vertical volumn supporting a headstock having controls thereon and carrying a spindle in the forward portion thereof, the combination comprising an operator platform, a floor panel on said platform extensible forwardly therefrom, a bracket rigidly fixed on the headstock adjacent the rear portion thereof and extending outwardly therefrom, and means mounting said platform on said bracket for swinging movement with respect thereto so that said platform can be swung from a position adjacent the headstock and the controls and spindle thereon to a position spaced therefrom whereby complete access can be had to the headstock.

3. In a machine tool including a vertical column supporting a spindle carrying headstock having controls thereon, the combination comprising an operator platform, a bracket rigidly fixed on the headstock and extending outwardly therefrom, said bracket including headstock controls thereon, and means mounting said platform on said bracket for swinging movement with respect thereto so that said platform can be swung from a position adjacent the headstock and the controls thereon to a position spaced therefrom whereby complete access can be had to the headstock.

4. In a machine tool including a vertical column supporting a spindle carrying headstock having controls thereon, the combination comprising an operator platform, a bracket rigidly fixed on the headstock and extending outwardly therefrom, and means mounting said platform on said bracket for swinging movement with respect thereto, said mounting means comprising a vertical shaft depending from said bracket, a sleeve surrounding said shaft, means including a thrust bearing rotatably supporting said sleeve on said shaft, and said platform being rigidly secured to said sleeve for swinging movement with respect to said headstock so that said platform can be swung from a position adjacent the headstock and the controls thereon to a position spaced therefrom.

5. In a machine tool including a vertical column supporting a spindle carrying headstock having controls thereon, the combination comprising an operator platform, a bracket rigidly fixed on the headstock and extending outwardly therefrom, said bracket including headstock controls thereon, and means mounting said platform on said bracket for swinging movement with respect thereto, said mounting means comprising a vertical shaft depending from said bracket, a sleeve surrounding said shaft, means including a thrust bearing rotatably supporting said sleeve on said shaft and said platform being rigidly secured to said sleeve for swinging movement with respect to said headstock so that said platform can be swung from a position adjacent the headstock and the controls thereon to a position spaced therefrom, said shaft extending through and above said bracket for mounting a control panel for use by an operator on said platform.

6. In a machine tool, the combination comprising a vertical column, a spindle carrying headstock vertically translatable on said column, a pendant control panel for controlling the operation of the spindle, a rigid upstanding member on said pendant control panel, means suspending said pendant control panel from said column, and means for releasably mounting said pendant control panel on said headstock with said rigid upstanding member disposed for lifting engagement with said suspending means as an incident to upward movement of said headstock and said pendant control panel in unison.

7. In a machine tool, the combination comprising a vertical column, spindle carrying headstock means vertically translatable on said column, pendant control panel means for controlling the operation of the spindle, means suspending said pendant control panel means from said column, means mounting said suspending means on the column for vertical and horizontal swinging movement with respect thereto, means for releasably mounting said pendant panel on said headstock, and means on said pendant control panel means for engaging said suspending means when the headstock is raised on the column to swing said suspending means upwardly whereby interference between said suspending means and the headstock is prevented.

8. In a machine tool, the combination comprising, a spindle carrying headstock, a pendant control panel for controlling the operation of the spindle, means for mounting said pendant control panel on said headstock including a bracket having a lower edge hinged to the headstock and swingable outwardly for receiving the pendant control panel, and clamp means for swinging said bracket with the pendant control panel thereon back against the headstock whereby said pendant control panel is rigidly mounted on said headstock in position for use therewith.

9. In a machine tool, the combination comprising a vertical column, a spindle carrying headstock vertically translatable on said column, a pendant control panel for controlling the operation of the spindle, means suspending said pendant control panel from said column, means for mounting said pendant control panel on said headstock including a bracket having a lower edge hinged to the headstock and swingable outwardly for receiving the pendant, means on said pendant control panel for slidably engaging said bracket, and clamp means for swinging said bracket with the pendant control panel thereon back against the headstock whereby said pendant control panel is rigidly mounted on said headstock means in position for use therewith.

10. In a machine tool having a vertical column supporting a spindle carying headstock for vertical movement thereon, a pendant control panel including controls for controlling the operation of the spindle, and means for releasably supporting the pendant control panel on the headstock, a support for the pendant control panel comprising, in combination, a hollow support post fixed to said column, a boom having one end swingably and pivotally supported at the upper end of said post and extending over the column and headstock, means including a tensioned cable suspending said pendant control panel from the free end of said boom and normally supporting the same in an accessible position for use by an operator, and means on said pendant control panel engageable with said boom for pivoting the same upwardly when said pendant control panel is mounted on the headstock and the pendant control panel and headstock are moved upwardly together on the column.

11. In a machine tool having a vertical column supporting a spindle carrying headstock for vertical movement thereon and a pendant control panel including controls for controlling the operation of the spindle, supply and utility conduits for the pendant control panel, and means for releasably supporting the pendant control panel on the headstock, a support for the pendant control panel comprising, in combination, a hollow support post fixed to said column, a boom having one end swingably and pivotally supported at the upper end of said post and extending over the column and headstock, the free end of said boom being curved downwardly to form a support for said supply and utility conduits, means including a tensioned cable suspending said pendant control panel from adjacent the free end of said boom and normally supporting the same in an accessible position for use by an operator, and rigid conduit means upstanding on said pendant control panel including a conduit entrance fitting means and means engageable with said boom for providing the same upwardly when said pendant control panel is mounted on the headstock and the pendant control panel and headstock are moved upwardly together.

12. In a machine tool including a vertical column supporting a spindle carrying headstock for vertical movement thereon, the headstock having controls therein, and a pendant control panel having controls for controlling the operation of the spindle and an operator platform, the combination comprising, a bracket rigidly fixed on the headstock and extending outwardly therefrom, means mounting the operator platform on said bracket for swinging movement with respect thereto so that said platform can be swung from a position adjacent the headstock and the controls thereon to a position spaced therefrom, means for releasably supporting said pendant control panel on the headstock, means for suspending the pendant control panel comprising a hollow support post fixed to said column, a boom having one end swingably and pivotally supported at the upper end of said post and extending over the column and headstock, means including a tensioned cable suspending said pendant control panel from the free end of said boom and normally supporting the same in an accessible position for use by an operator, and means on said pendant control panel engageable with said boom for pivoting the same upwardly when said pendant control panel is mounted on the headstock for use by an operator stationed on said platform and the pendant control panel and headstock are moved upwardly together.

References Cited by the Examiner
UNITED STATES PATENTS

| 2,251,015 | 7/41 | Gallimore | 29—26 |
| 2,350,174 | 5/44 | Lucas et al. | 29—26 |
| 2,726,358 | 12/55 | Barnhart | 318—17 |
| 2,786,395 | 3/57 | McFerren et al. | 90—11.1 |

FOREIGN PATENTS 1,004,368 11/51 France.

ANDREW R. JUHASZ, *Primary Examiner.*

WILLIAM W. DYER, Jr., *Examiner.*